Patented July 6, 1954

2,683,103

UNITED STATES PATENT OFFICE 2,683,103

CURING ORGANIC SUBSTITUTED POLYMERS WITH OXIMES

Malcolm A. Smook and Irvan D. Roche, Wilmington, Del., assignors to E. I. du Pont de Nemours & Company, Wilmington, Del., a corporation of Delaware No Drawing. Application November 29, 1951, Serial No. 258,984

5 Claims. (Cl. 154—43)

This invention relates to synthetic elastomers, to processes for their preparation and more particularly relates to adhesives containing cured and curable substituted hydrocarbon polymers such as the chlorosulfonated solid polymers of ethylene.

The McQueen U. S. Patent 2,212,786, issued August 27, 1940, describes a process for the preparation of chlorosulfonated olefin polymers and especially chlorosulfonated products of the normally solid polymers of ethylene. The patented process is applicable to the chlorosulfonation of other saturated hydrocarbon polymers, such, for example, as the polyisobutylenes, Fischer-Tropsch hydrocarbons, polymethylenes, polyacrylonitriles and others. In the McAlevy et al. U. S. Patent 2,416,061, issued February 18, 1947, there is described a process of curing hydrocarbon and oxygenated hydrocarbon polymers which have been chlorosulfonated in accord with the process of McQueen patent. The latter patent, in addition to the chlorosulfonation reaction, describes other reactions giving products that can be cured and thereby converted to elastomers. In order to produce such products the patentees state that polymers should carry at least two substituent groups. Those that impart (1) elastic properties provided by:

A—Halogen
B—Hydrocarbon and
C—Acyloxy groups, and (2) those that make it possible to cure the product, provided by a:

A—Sulfonated,
B—Phosphonated,
C—Carboxylated,
D—Chlorosulfonated,
E—Chlorophosphonated,
F—Chlorocarboxylated, and
G—A hydrogen sulfide group The patentees describe as curing agents for these and equivalent products, polyvalent metal oxides and their hydroxides together with other compounding agents.

The formulations of the art do not provide satisfactory elastomers from the aforesaid substituted polymers for all purposes. This is particularly true when these elastomers are used as adhesives, cements and the like for fixing camelback of synthetic and natural rubber to tire carcasses, and for other uses which require bonding these substituted polymers to elastomers generally or to themselves. Moreover, adhesives containing the chlorosulfonated polymers of ethylene and polyvalent metal oxides as curing agents are deficient as adhesives for elastomers generally.

An object of this invention is to provide formulations of the substituted elastomers that have unique adhesive characteristics. The above and other objects of the invention are provided by compounding polyoximes with hydrocarbon polymers that have been substituted with halogen, hydrocarbon, or acyloxy groups and also have been substituted with sulfonated, phosphonated, carboxylated, chlorosulfonated, chlorophosphonated, chlorocarboxylated groups or a hydrogen sulfide group. Another object is to provide an adhesive of a chlorosulfonated polymer of ethylene and quinone dioxime. Yet another object is to provide from the chlorosulfonated hydrocarbon polymers and a dioxime a bond between lamina of natural and synthetic elastomers. Other objects and advantages of the invention will hereinafter appear.

The elastomers and adhesive compositions of the invention are compositions of matter containing substituted solid hydrocarbon polymers above described in admixture with a polyoxime. Specific examples of the polyoximes that may be used in accord with the invention are o- and p-quinone dioxime and succinaldehyde dioxime. To this mixture of polymer and polyoxime there may be added such additional modifiers as carbon black, acid neutralizers, rosin esters and the like for the sake of further improvements. The resulting mixture, after curing, has tensile strengths ranging from 750 to 4000 or more p. s. i. with elongations at break from 500% to 100% and lower.

Table I indicates the range of physical properties which can be obtained in these curing systems by variations in the compounding ingredients. Compound 1 constitutes a cured elastomer of a chlorosulfonated polymer of ethylene with polyvalent metal compounds. Its properties are shown for purposes of comparison. This type of a vulcanization product has been disclosed in the McAlevy et al. patent ibid. No appreciable cure was effected in compound 2 but when p-quinone dioxime was added to a similar recipe, compound 3, a high strength cure was obtained. Compound 4, compared with compound 5, shows that succinaldehyde dioxime gives equivalent properties to paraquinone dioxime (GMF); compounds 6, 7, and 8 that with and without carbon black, dioxime gives a satisfactory cure and compound 10 that the properties of an elastomer containing 5 parts of GMF are lower than those of compound 8 containing 10 parts of GMF.

Compounds 9, 11, 12, and 13 demonstrate that the addition of small amounts of bases, such as sodium acetate or diphenyl guanidine, seem to accelerate the rate of cure sufficiently so that tighter cures are obtained when using the same curing cycles, i. e. 30 minutes curing at 160° C. A and stress strain curve of the adhesive. Thus adhesives can be designed to fall within modulus limits set by those of the two substrata. That is, it is recognized by the art that the modulus of an adhesive should usually fall between the moduli of the substrata, since flexing will then distribute the strain between the three components.

The compositions of the invention are produced, more specifically, by mixing the polyoxime with the substituted polymer, with or without other adjuvants, in any suitable manner. Thorough incorporation may be accomplished by passing the mixture through the rolls of a rubber mill or the polyoxime may be mixed with the substituted polymer in a suitable machine, such as a Banbury mixer, or the association effected by mixing a solution of the polyoxime with a solution of the substituted polymers, with or without the additional modifiers.

*Table I*

| Compound | 1 | 2 | 3 | 4 | 5 | 6 | 7 | 8 | 9 | 10 | 11 | 12 |
|---|---|---|---|---|---|---|---|---|---|---|---|---|
| Elastomer* | 100 | 100 | 100 | 100 | 100 | 100 | 100 | 100 | 100 | 100 | 100 | 100 |
| Wood rosin, W. G | 10 | | | | | | | | | | | |
| EPC Black | 39.4 | 28 | 28 | 28 | 54 | 41 | | 26.2 | 55.3 | 33.6 | 55.3 | 55.3 |
| Litharge | 40 | | | 10 | | | | | | | | |
| Mercaptobenzothiazole | 3 | | | | | | | | | | | |
| P-Quinone Dioxime | | | 10 | 10 | | | 10 | 10 | 10 | 5 | 10 | 10 |
| Succinaldehyde Dioxime | | | | | 10 | | | | | | | |
| 2,5-Hexanedionedioxime | | | | | | | | | | | | |
| CaCO₃ | | | | | | | | | | | | |
| Glutaraldehyde Dioxime | | | | | | | | | | | | |
| Pb₃O₄ | | 10 | 7.5 | | 5 | | | | | | | |
| Sodium Acetate | | | | | | | | | | | 1 | |
| Diphenyl guanidine | | | | | | | | | | | | 0.5 |
| TiO₂ | | | | | | | | | | | | |
| P-33 Black | | | | | | | | | | | | |
| Staybelite Ester-10 | | | | | | | | | | | | |
| Pine Tar | | | | | | | | | | | | |
| Physical Properties: | | | | | | | | | | | | |
| Hardness, Shore A | | | | | | | | | | | | |
| 100% Modulus, ASTM D-412 | 1,375 | | 1,810 | 1,680 | 2,050 | 540 | 500 | 1,550 | 2,710 | 1,015 | 1,985 | 3,325 |
| Tensile Strength, p. s. i | 3,365 | 500 | 3,000 | 3,200 | 2,980 | 750 | 1,540 | 2,700 | 2,710 | 1,730 | 3,235 | 3,325 |
| Elongation at break, percent | 225 | | 180 | 200 | 160 | 400 | 350 | 200 | 100 | 360 | 125 | 100 |
| Elongation 1 minute after break, (residual) percent | 12 | | 10 | 15 | 10 | 80 | 30 | 15 | 10 | 43 | 15 | 10 |

| Compound | 13 | 14 | 15 | 16 | 17 | 18 | 19 | 20 | 21 | 22 | 23 | 24 |
|---|---|---|---|---|---|---|---|---|---|---|---|---|
| Elastomer* | 100 | 100 | 100 | 100 | 100 | 100 | 100 | 100 | 100 | 100 | 100 | 100 |
| Wood rosin, W. G | | | | | | | | | | | | |
| EPC Black | 55.3 | 47.9 | | | 5 | | | | | | | |
| Litharge | | | | | | | | | | | | |
| Mercaptobenzothiazole | | | | | | | | | | | | |
| P-Quinone Dioxime | 10 | 15 | 10 | 10 | 10 | 10 | 10 | 10 | | | | |
| Succinaldehyde Dioxime | | | | | | | | | | | | |
| 2,5-Hexanedionedioxime | | | | | | | | | 5 | 20 | | |
| CaCO₃ | | | | 41.2 | 20 | 25 | 50 | 50 | 20 | | 20 | |
| Glutaraldehyde Dioxime | | | | | | | | | | | 5 | 20 |
| Pb₃O₄ | | | | | 10 | 10 | 10 | 10 | | | | |
| Sodium Acetate | | | | | | | | | | | | |
| Diphenyl guanidine | 2 | 0.5 | 0.5 | 0.5 | | | | | | | | |
| TiO₂ | | | 60.4 | | | | | | | | | |
| P-33 Black | | | | | 5 | | | | | | | |
| Staybelite Ester-10 | | | | | 20 | 20 | 20 | 10 | | | | |
| Pine Tar | | | | | | | | 10 | | | | |
| Physical Properties: | | | | | | | | | | | | |
| Hardness, Shore A | | | | | 71 | 73 | 75 | 79 | | | | |
| 100% Modulus, ASTM D-412 | 3,460 | | 1,330 | 1,160 | 1,160 | 900 | 1,200 | 1,405 | | 1,200 | 470 | 300 |
| Tensile Strength, p. s. i | 3,675 | 3,640 | 2,415 | 2,125 | 2,155 | 2,630 | 2,060 | 2,520 | | 2,690 | >1,650 | >1,030 |
| Elongation at break, percent | 110 | 75 | 260 | 250 | 200 | 300 | 220 | 240 | | 385 | >560 | >500 |
| Elongation 1 minute after break, (residual) percent | 18 | 12 | 22 | 15 | 10 | 15 | 10 | 10 | | 40 | | |

*Chlorosulfonated polymer of ethylene, 27% Cl, 1.9% S.

comparison of compound 12 with compound 14 reveals that a tighter cure can also be obtained by use of a larger amount of GMF. The satisfactory use of other fillers than carbon black is shown by compounds 15 and 16. Compounds 17, 18, 19, and 20 are adhesive compositions which can be used as solid interlayers or liquid cements or per se. Variations in the tackifier and/or filler loading will produce differences in the hardness The polyoxime may be present in the composition of the invention to the extent of from 2 to 50 and preferably 5 to 15 parts per 100 parts of the substituted polymer. The additional modifiers if present, including tackifiers, other curing agents, antioxidants, accelerators and the like, may be combined in any desired proportion to give the minor improvements sought. The tackifiers, for example, may be present in amounts ranging from 15 to 30 parts by weight per 100 parts of the substituted hydrocarbon polymer. Any compatible type of tackifier may be employed, such, for example, as "Polypale" (an ester of wood rosin), "Staybelite" (an ester of hydrogenated wood rosin), cumarone indene resin, pine tar, "Resinex" (polymerized aromatic resins), wood rosin, "Pentalyn" (pentaerythritol esters of wood rosin), "Kenflex" (aromatic hydrocarbon polymers) and the like. These tackifiers are added principally to provide a product which can be manually pressed on elastomeric substances under normal conditions for prefabrication, after which the final bonding between the compounds of the invention and the elastomeric substances is accomplished by subjecting the fabricated product to heat and pressure.

If as additional modifying agents acid neutralizers are used, such, for example, as $Pb_3O_4$, they are added to the extent of from 5 to 15 parts per 100 parts by weight of the substituted polymer. Small amounts of basic accelerators can be used with advantage, such as diphenylguanidine and sodium acetate. These agents are added to give from 0.1 to 5% thereof, based on the weight of the substituted polymer. Fillers and pigments, such as barium sulfate, kaolin, diatomaceous earth, powdered talc, titanium dioxide, calcium sulfate, calcium carbonate, carbon black and the like may be used to improve the products for certain purposes and may be present up to 100 parts or more by weight per 100 parts of the substituted polymer, and preferably 10 to 50 parts on the same basis.

The substituted polymers, after the addition of the polyoxime, whether or not they are compounded with the tackifiers, fillers and the like described above, are heated to cure the polymer and complete the bonding. Temperatures between 25 and 175° C. should be applied for a period preferably in the order of 10 to 120 minutes with a pressure between 25 to 1500 lbs./sq. in. Curing and bonding, however, will take place at lower temperatures and pressures although at slower rates.

Shaped articles can be produced by curing the chlorosulfonated polymers and the polyoxime in a suitable mold, either alone or in conjunction with other elastomeric substances. When shaped articles are prepared from the compositions containing chlorosulfonated polymers of ethylene and a polyoxime, it is usually desirable to have present other modifying agents such, for example, as accelerators, fillers, acid neutralizers and the like.

As an adhesive or cement, the composition of the invention has been found to possess unusual properties. They may be used in many ways and are supereior to known adhesives for many uses and especially for laminating layers or masses of elastomers together. They are adaptable for laminating layers of the same elastomer together and are particularly suitable for laminating layers of different elastomers together, cured and uncured.

Superior laminations have been made in which the bond produced by the composition of the invention is superior to the strength of either lamina bonded together. High strength laminations can be made with multiple layers of chlorosulfonated polymers of ethylene, natural rubber, neoprene and also laminations with layers of other synthetic rubbers, such as those obtained by copolymerizing butadiene-styrene, butadiene-acrylonitrile and butadiene-isoprene. Not only can highly satisfactory bonds be made between lamina of the aforesaid materials but also the adhesive compositions of the invention give superior bonds between the lamina of similar or dissimilar elastomeric material such as those described above.

When used as an adhesive the compositions may be applied to the surfaces being treated from solution, as a paste or as a film. In any case the surface to be treated is first carefully cleaned and preferably buffed slightly prior to the application of a uniform layer of the adhesive. This layer may vary from 2 to 50 mils more or less in thickness. The laminated or fabricated structure, as the case may be, is then subjected to heat and pressure as has been described.

The adhesive compositions of Examples A to H of Table II, part 1, were prepared by milling the particular substituted polymer and the polyoxime together with compounding agents, fillers, tackifiers, etc., used on a 6" rubber mill. The resulting stock was then sheeted out and (1) used as such between elastomers to be laminated, (2) dissolved in a suitable solvent for use as a fluid adhesive or (3) charged to a mold for heat and pressure curing to give molded objects.

Table II, part 2, describes the compounding ingredients used in the preparation of the strata and substrata which are bound together by the adhesive compositions of Table II, part 1. The laminations resulting from these uses of the adhesives of the invention are described in Table III.

*TABLE II (Part 1)*

|  | (A) | (B) | (C) | (D) | (E) | (F) | (G) | (H) |
|---|---|---|---|---|---|---|---|---|
| Elastomer | [1] 100 | [1] 100 | [1] 100 | [1] 100 | [1] 100 | [1] 100 | [1] 100 | [1] 100 |
| P-Quinone Dioxime [2] |  | 10 | 10 | 10 | 5 | 10 |  |  |
| Succinaldehyde Dioxime |  |  |  |  |  |  |  | 10 |
| Wood rosin, W. G. Grade |  |  |  |  |  |  | 10 |  |
| SRF Black | 14.2 |  |  |  |  |  |  |  |
| Litharge | 40 |  |  |  |  |  | 40 |  |
| Mercaptobenzothiazole | 2 |  |  |  |  |  | 2 |  |
| $Pb_3O_4$ |  | 10 |  |  |  |  |  | 5 |
| $CaCO_3$ |  | 33 |  |  |  |  |  |  |
| Staybelite Ester-10 [3] |  | 20 |  |  |  |  |  |  |
| EPC Black |  |  | 26.2 | 55.3 | 32.6 | 55.3 | 43.3 | 54 |
| Diphenyl guanidine |  |  | 0.25 | 0.5 |  | 0.25 |  |  |

[1] Chlorosulfonated polymer of ethylene—27% Cl, 1.9% S.
[2] GMF.
[3] Glycerol ester of hydrogenated rosin.

TABLE II (Part 2)

| | (I) | (J) | (K) | (L) | (M) | (N) |
|---|---|---|---|---|---|---|
| HEVEA Rubber (#1 R. S. S.) | 100 | | | | | |
| Neoprene, Type W | | 100 | | | | 100 |
| GR-S (Standard) | | | 100 | | | |
| Butyl Rubber (GR-I) | | | | 100 | | |
| Acrylonitrile Rubber (Butadiene-Acrylonitrile) | | | | | 100 | |
| Reogen | 2 | | 4 | | | |
| Stearic Acid | 3 | 0.5 | 1 | 1 | | 0.5 |
| Pine Tar | 1 | | | | | |
| Age Rite Hipar | 1 | | | | | |
| Age Rite Resin D | 1 | | | | | |
| Zinc Oxide | 3 | 5 | 5 | 5 | 5 | 5 |
| MPC Black | 47.5 | | | | | |
| Sulfur | 3 | | 1.7 | 2 | 1.5 | |
| Mercaptobenzothiazole | 1 | | | 0.5 | | |
| Phenyl-Alpha Naphthylamine | | 2 | | | | 2 |
| SRF Black | | 29 | | 25 | 45 | 51.8 |
| Di-o-Tolylguanidine Salt of Dicatechol Borate | | 0.5 | | | | 0.5 |
| Magnesium Oxide | | 2 | | | | 2 |
| Liquid Asphalt | | | 3 | | | |
| Age Rite Stalite | | | 1 | | | |
| EPC Black | | | | 45 | 25 | |
| Benzothiazyl Disulfide | | | | 1.2 | 1 | |
| Zinc Dimethyl Dithiocarbamate | | | | 0.15 | | |
| Petrolatum | | | | | 2 | |
| Tetramethyl Thiuram Disulfide | | | | | 1 | |

TABLE III

| Example No. | Layers Bonded | Control (No adhesive) | Interlayer | Adhesive (No tackifier) | Adhesive (Plus tackifier) | Peel Strength lbs./in. |
|---|---|---|---|---|---|---|
| 1 | G-I | X | | | | 10 |
| 2 | G-I | | F | | | 86 |
| 3 | G-I | | | E | | 64 |
| 4 | G-J | X | | | | 7 |
| 5 | G-J | | C | | | 54 |
| 6 | G-K | X | | | | 20 |
| 7 | G-K | | F | | | >90 |
| 8 | G-L | X | | | | 12 |
| 9 | G-L | | | | B | 53 |
| 10 | G-M | X | | | | 9 |
| 11 | G-M | | | B | | 31 |
| 12 | I-J | X | | | | 11 |
| 13 | I-N | | F | | | 44 |
| 14 | I-L | X | | | | 7 |
| 15 | I-L | | F | | | 54 |
| 16 | I-K | X | | | | 65 |
| 17 | I-K | | | | B | 53 |
| 18 | I-M | X | | | | 9 |
| 19 | I-M | | | B | | 26 |
| 20 | J-K | X | | | | 22 |
| 21 | J-K | | | B | | 30 |
| 22 | J-L | X | | | | 8 |
| 23 | J-L | | | B | | 29 |
| 24 | J-M | X | | | | 19 |
| 25 | J-M | | | B | | 41 |
| 26 | K-L | X | | | | 2 |
| 27 | K-L | | | B | | 38 |
| 28 | K-M | X | | | | 16 |
| 29 | K-M | | | | B | 44 |
| 30 | L-M | X | | | | 4 |
| 31 | L-M | | | B | | 30 |

Table III gives 31 examples wherein the adhesive compositions are used to bind into a composite whole, lamina of natural and synthetic elastomers. In Table III bonding strengths are given which range from 2 lbs. per inch to greater than 90 lbs. per inch. The bond strength was determined by applying a force between the stratum and the substratum until the bond was broken or the stratum or substratum was torn. This table also illustrates preferred embodiments of the invention wherein various combinations of the following elastomers: chlorosulfonated polymers of ethylene, hevea rubber, neoprene, GR-S, GR-1 and acrylonitrile rubber were bonded or laminated together during vulcanization. These examples, in addition, illustrate the versatility of the adhesive and show the appreciable improvement which has been obtained in the strength of the bonded vulcanizate when solid or adhesive-type interlayers of the compositions of the invention are used. In some examples tackifying agents were added to improve the "building tack" of the laminate prior to vulcanization. Table III also demonstrates the value of these new curing systems when they are used as adhesives.

When an interlayer composition of a conventional curing system for the chlorosulfonated polymers of ethylene (see Table II, composition G) without a polyoxime, was used to laminate compositions A to I, a bond strength of 3 lbs./in. was obtained. This illustrates the poor results obtainable by the use of a vulcanizing system for the polymer which contains no polyoxime. Scorch test determinations indicate there is difficulty obtaining compatible cure rates when interlayer curing compositions containing mercaptobenzothiazole, or other sulfur-containing accelerators and/or appreciable litharge are used without a polyoxime. Thus, too rapid vulcanization at the interface of the lamina will produce scorching and resultant poor bond strength. On the other hand, we have found that compositions on both hevea rubber with the polyoxime or the chlorosulfonated polymer of ethylene containing polyoximes cure at a slow rate. Thus in the curing of lamina separated by interlayer compositions of chlorosulfonated polymer of ethylene vulcanized principally by polyoxime materials, a satisfactory range of softening and/or vulcanizing rates are obtained and probable chemical bonding is effected.

A high strength bond was also obtained between substrata (G) and (I) by use of adhesive solutions containing (H), a chlorosulfonated polymer of ethylene combined with succinaldehyde dioxime. These bonds had the same appearance, i. e. of tearing portions of each substrate from the other as has been noted in other high strength bonds, when separation was attempted, shown in Table III. There is abundant experimental proof to show that such tearing may be evidence of true chemical bonding.

In Table III, Example 3, the adhesive layer (E) was applied to the substratum from a solution of 100 grams of the formula (Table II, part 1) dissolved in 100 cc. of toluene and 400 cc. of benzene containing 5 grams of "Polypale" resin. In Examples 9, 17 and 29 of Table III, (see adhesive B) the elastomer, $CaCO_3$ and $Pb_3O_4$ were milled on a two roll rubber mill to effect complete mixing. The composite was then ball and jewel cut to 1/8" particles and dissolved to 25 wt. per cent in benzene. GMF was dispersed by the use of 0.2 wt. per cent aluminum stearate into toluene, and this dispersion was added to the above solution. In those examples noted, a toluene solution of tackifier was added to give the desired tackifier concentration. The adhesives of Examples 3, 11, 19, 21, 23, 25, 27 and 31 were made in a similar manner without the incorporation of a tackifier. Two coats of the adhesive were applied, the first coat being dried before applying the second coat. The top layer was then placed on the adhesive layer. In the other examples an inner layer of a milled chlorosulfonated polymer of ethylene compound, 5 to 30 mils in thickness, was placed on the substratum and the top layer then superimposed. The resulting laminations were then subjected to a temperature between 140 and 165° C. and a pressure of 100 to 250 p. s. i. to simultaneously cure and bind the lamina together. After the curing operation the bond strength was measured by pulling the top layer from the other substratum until complete failure resulted.

A special method is recommended to obtain optimum bonds between lamina of compounded, uncured chlorosulfonated polymers of ethylene to cured, natural or synthetic rubber stock. The surface of the cured stock is first buffed and then wiped clean with a solvent prior to application of the adhesive layer and subsequent vulcanization under pressure. Using this procedure a strong lamination of uncured composition G to cured composition I was effected with a solution adhesive containing composition C (see Table II) followed by vulcanization at 250 p. s. i. (30 minutes at 160° C.).

Many rubber articles are not fabricated as a single piece or mass. Tires, V-belts, transmission belts and hose are built up into the final object by the use of a multiplicity of layers or plies of uncured rubber and the assembly is placed as a unit into a press for vulcanization. A chemical type of bonding between layers must be obtained which is as strong as the layers themselves so that no separation will occur during use due to flexing and its resultant frictional heat. Similarly, by the process and adhesives of this invention, multilayered products can be formed having superior properties.

We claim:

1. A lamination containing elastomers of the group consisting of natural rubber, neoprene, chlorosulfonated polymers of ethylene, butadiene-styrene copolymers, butadiene-acrylonitrile copolymers and butadiene-isoprene copolymers, the lamina of which are bound together by a cured chlorosulfonated solid polymer of ethylene combined chemically with paraquinone dioxime.

2. A composition of matter comprising a chlorosulfonated solid polymer of ethylene and paraquinone dioxime.

3. A composition of matter comprising a chlorosulfonated solid polymer of ethylene and from 5 to 15 parts of paraquinone dioxime per 100 parts of the substituted polymer of ethylene.

4. A cured polymer of claim 2.

5. A cured polymer of claim 3.

References Cited in the file of this patent

UNITED STATES PATENTS

| Number | Name | Date |
|---|---|---|
| 2,393,321 | Haworth | Jan. 22, 1946 |
| 2,586,363 | McAlevy | Feb. 19, 1952 |

OTHER REFERENCES

Warner, Rubber Age 71, 205, 206, 207 (May 1952).